(12) United States Patent
Eddings et al.

(10) Patent No.: US 8,407,665 B1
(45) Date of Patent: Mar. 26, 2013

(54) RENDERING CONTEXTUAL RELATED CONTENT WITH A DOCUMENT, SUCH AS ON A WEB PAGE FOR EXAMPLE

(75) Inventors: Jeffery Eddings, San Ramon, CA (US); Jerry Felker, West Hills, CA (US); Shuman Ghosemajumder, Palo Alto, CA (US); Nathan Lucash, San Francisco, CA (US); Hunter Walk, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1337 days.

(21) Appl. No.: 11/323,302

(22) Filed: Dec. 30, 2005

Related U.S. Application Data

(60) Provisional application No. 60/737,267, filed on Nov. 16, 2005.

(51) Int. Cl.
*G06F 9/44* (2006.01)
(52) U.S. Cl. .......................... 717/106; 717/123
(58) Field of Classification Search .......... 717/106–109, 717/120, 122, 123
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,401,075 B1 | 6/2002 | Mason et al. |
| 6,446,045 B1 | 9/2002 | Stone et al. |
| 6,829,587 B2 | 12/2004 | Stone et al. |
| 6,985,882 B1 | 1/2006 | Del Sesto |
| 7,039,599 B2 | 5/2006 | Merriman |
| 7,136,875 B2 | 11/2006 | Anderson et al. |
| 7,240,025 B2 | 7/2007 | Stone et al. |
| 7,249,059 B2 | 7/2007 | Stone et al. |
| 2002/0072997 A1* | 6/2002 | Colson et al. .................... 705/27 |
| 2003/0028618 A1* | 2/2003 | Currans et al. ................ 709/218 |

(Continued)

FOREIGN PATENT DOCUMENTS

WO    WO 97/21183    6/1997

OTHER PUBLICATIONS

Canto Columlus, "Cumulus Web Publisher Pro—Administrator Guide", 2003, Canto GmbH, pp. 1-43.*

(Continued)

*Primary Examiner* — Ted T Vo
(74) *Attorney, Agent, or Firm* — Lerner, David, Littenberg, Krumholz & Mentlik, LLP

(57) ABSTRACT

Content owners (e.g., Website publishers) are provided with a simple mechanism to automatically summarize and display information (news, images, maps, etc.) related to inferred interests of a user or users visiting their Website. The targeting can driven by a variety of mechanisms including, for example, an automated contextual understanding of the content of the Web page, profile-based information derived from personal data supplied by, or inferred from actions by, the user visiting the Website, location-targeted information (e.g., inferred by the Website visitor's current geography), etc. "Related Content Units" may be used to help content owners render useful, related, content by allowing for a variety of targeting methods to gather related pieces of Internet content and present them integrated into an HTML iFrame or a JavaScript/XML feed which can be easily integrated by the Website publisher onto the Web pages of their Website.

28 Claims, 7 Drawing Sheets

U.S. PATENT DOCUMENTS

2006/0129916 A1* 6/2006 Volk et al. .................. 715/513

OTHER PUBLICATIONS

McKell, "Using Novell Net Publisher to Publish, Share, and Store Files on the Web", Sep. 2000, Novell, pp. 1-19.*
Barroso et al., "Web Search for a Planet:The Google Cluster Architecture" 2003, IEEE, pp. 22-28.*
Chris Bowyer, "JavaScript Programming 101", 2003, http://www.websitepublisher.net/article/javascript_primer/2, 5 pages.*
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive from www. Archive.org, Apr. 12, 1997 and Feb. 1, 1997.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Zeff, R. et al., *Advertising on the Internet*, $2^{nd}$ Ed., John Wiley & Sons, 1999.
U.S. Appl. No. 95/001,073, filed Jul. 30, 2008, Stone et al.
U.S. Appl. No. 95/001,061, filed Jul. 7, 2008, Stone et al.
U.S. Appl. No. 95/001,069, filed Jul. 21, 2008, Stone et al.
U.S. Appl. No. 95/001,068, filed Jul. 14, 2008, Stone et al.
Request for Reexamination of U.S. Patent No. 7,240,025 B2, U.S. Appl. No. 95/001,073, filed Jul. 30, 2008.
Request for Reexamination of U.S. Patent No. 6,446,045 B1, U.S. Appl. No. 95/001,061, filed Jul. 7, 2008.
Request for Reexamination of U.S. Patent No. 7,249,059 B2, U.S. Appl. No. 95/001,069, filed Jul. 21, 2008.

* cited by examiner

Ad Formats with Related Content

300x250

| Related Searches | Related News | Related Pages |
|---|---|---|

Shanahan Explains Why Clarett Left Broncos
San Francisco Chronicle - 22 hours ago Broncos rectify draft-day mistake
Longmont Daily Times-Call - 5 hours ago Broncos run past the porous Colts
San Jose Mercury News - Aug 28, 2005

Denver Broncos 2005 Season Preview
Seattle Post Intelligencer -Aug 26, 2005

Denver Broncos 2005 Season Preview
WTEV, FL - Aug 26, 2005 by Google

FIGURE 5A

| Related Searches | Related News | Related Pages |
|---|---|---|

Shanahan Explains Why Clarett Left Broncos
San Francisco Chronicle - 22 hours ago Broncos rectify draft-day mistake
Longmont Daily Times-Call - 5 hours ago Broncos run past the porous Colts
San Jose Mercury News - Aug 28, 2005

Denver Broncos 2005 Season Preview
Seattle Post Intelligencer -Aug 26, 2005

Denver Broncos 2005 Season Preview
WTEV, FL - Aug 26, 2005 by Google

Related Searches | Related News | Related Pages          by Google
• Denver Broncos Schedule • Denver-Broncos.com • Broncos Tickets • Broncos NFL • Broncos Games • Mark Jackson Broncos • Denver-Broncos Products

FIGURE 5C

Related Searches | Related News | Related Pages          by Google
• Denver Broncos Schedule         • Broncos Games
• Denver-Broncos.com              • Mark Jackson Broncos

| Related Searches | Related News | Related Pages |
|---|---|---|
| • Denver Broncos Schedule<br>• Denver-Broncos.com<br>• Broncos Tickets<br>• Broncos NFL | • Broncos Games<br>• Mark Jackson Broncos<br>• Denver-Broncos Products<br>• Denver Broncos Schedule | • Broncos Tickets<br>• Broncos NFL<br>• Broncos Games<br>• Mark Jackson Broncos |

| Related Searches | Related News | Related Pages |
|---|---|---|
| • Denver Broncos Schedule<br>• Denver-Broncos.com<br>• Broncos Tickets<br>• Broncos NFL | • Broncos Games<br>• Mark Jackson Broncos<br>• Denver-Broncos Products<br>• Denver Broncos Schedule | • Broncos Tickets<br>• Broncos NFL<br>• Broncos Games<br>• Mark Jackson Broncos |

FIGURE 5F

RENDERING CONTEXTUAL RELATED CONTENT WITH A DOCUMENT, SUCH AS ON A WEB PAGE FOR EXAMPLE

§0. RELATED APPLICATIONS

This application claims benefit to Provisional Application Ser. No. 60/737,267 (incorporated herein by reference), titled "RENDERING CONTEXTUAL RELATED CONTENT WITH A DOCUMENT, SUCH AS ON A WEB PAGE FOR EXAMPLE," filed on Nov. 16, 2005, and listing Jeffery Eddings, Jerry Felker, Shuman Ghosemajumder, Nathan Lucash and Hunter Walk as the inventors.

§1. BACKGROUND OF THE INVENTION

§1.1 Field of the Invention

The present invention concerns information retrieval. In particular, the present invention concerns automated information retrieval for supplementing and improving content, such as online content.

§1.2 Related Information

Website publishers try to provide content that will be of particular interest to their users. In an attempt to provide rich, deep, and up-to-date access to information, this routinely involves manually gathering and periodically editing related content (or links to related content) which may be of particular interest to their users. It's challenging for Website publishers to manage the selection and presentation of additional content related to their Web page and Website visitors. Yet, it is highly desirable to provide such information in order to help keep users at their Website (e.g., to have a so-called "sticky" Website).

One way to identify contextually related news, images, searches, Web pages, blogs, RSS feeds, audio clips, videos clips, etc. ("related content"), is to analyze the particular content of the individual page manually. For example, a publisher of a news Website writing about Apple Computer may place a hand-edited collection of news links about Apple alongside their article for readers who want more information. Unfortunately this process is cumbersome, manual and difficult to scale with large amounts of new, and changes to existing, content and resources.

U.S. patent application Ser. No. 10/748,870 (referred to as "the '870 application" and incorporated herein by reference), filed on Dec. 29, 2003, titled "IDENTIFYING RELATED INFORMATION GIVEN CONTENT AND/OR PRESENTING RELATED INFORMATION IN ASSOCIATION WITH CONTENT-RELATED ADVERTISEMENTS," and listing Jeffrey A. Dean, Krishna Bharat and Paul Buchheit as inventors describes techniques for providing, on target content, additional content related to the target content. The target content might be past search queries, news articles, reviews, weather, a set of ads, etc. However, the techniques described in the '870 application could be improved.

Contextual advertising systems can analyze a Web page's contents and provide advertisements that are related. Examples of contextual advertising are described in U.S. patent application Ser. Nos. 10/314,427 (referred to as "the '427 application" and incorporated herein by reference), titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and 10/375,900 (referred to as "the '900 application" and incorporated by reference), titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors. These applications describe methods and apparatus for serving ads relevant to the content of a document, such as a Web page for example.

Advertising systems and components thereof that consider user location are described in U.S. patent application Ser. No. 10/654,265 (referred to as "the '265 application" and incorporated herein by reference), filed on Sep. 3, 2003, titled "DETERMINING AND/OR USING LOCATION INFORMATION IN AN AD SYSTEM", and listing Leslie Yeh, Sridhar Ramaswarmi, and Zhe Qian as inventors Advertising systems and components thereof that consider user information are described in U.S. patent application Ser. No. 10/452,791 (referred to as "the '791 application" and incorporated herein by reference), filed on Jun. 2, 2003, titled "SERVING ADVERTISEMENTS USING USER REQUEST INFORMATION AND USER INFORMATION", and listing Krishna Bharat, Steve Lawrence, Mehran Sahami, and Amit Singhal as inventors; U.S. patent application Ser. No. 10/610,322 (referred to as "the '322 application" and incorporated herein by reference), filed on Jun. 30, 2003, titled "RENDERING ADVERTISEMENTS WITH DOCUMENTS HAVING ONE OR MORE TOPICS USING USER TOPIC INTEREST INFORMATION", and listing Krishna Bharat as the inventor; U.S. patent application Ser. No. 10/750,363 (referred to as "the '363 application" and incorporated herein by reference), filed on Dec. 31, 2003, titled "GENERATING USER INFORMATION FOR USE IN TARGETED ADVERTISING" and listing Krishna Bharat, Steve Lawrence, and Mehran Sahami as inventors; and U.S. patent application Ser. No. 10/955,828 (referred to as "the '828 application" and incorporated herein by reference), filed on Sep. 30, 2004, titled "DETERMINING ADVERTISEMENTS USING USER BEHAVIOR INFORMATION SUCH AS PAST NAVIGATION INFORMATION" and listing David Bau as the inventor.

Although contextual advertising systems provide ads related to the content of a Web page or document (and/or to a user location, and/or to a particular user), ads are specifically commercial, and the benefit may be skewed toward the advertiser and Web publisher, and away from the end-user, particularly in systems that use offer information (e.g., offer per ad impression, maximum offer per ad impression, offer per ad selection, maximum offer per ad selection, offer per ad conversion, maximum offer per ad conversion, etc.) to make decisions about which ads to serve and how to serve them.

Further, in contextual advertising systems, ads are normally targeted using targeting information expressly entered by the advertiser (e.g., using keywords or categories). However, Web page publishers often want to provide related content that, unlike targeted advertisements, might not include information entered and used expressly for targeting.

The AdSense advertising network by Google at least takes end user utility into consideration. Specifically, it considers selection rates (click-through rates) when scoring ads competing in an arbitration (e.g., an auction). However, since partner Web publishers participating in the AdSense advertising network share a portion of advertising proceeds, price information (e.g., offers) associated with various ads still impacts which ads are to be rendered with a Web page, as well as how such ads are to be rendered (e.g., ordering).

In view of the foregoing, it would be useful to help Web publishers to provide useful related content, or links thereto, on their Websites and Web pages. It would be particularly useful if providing such related content required little Web publisher work, both initially, and on an on-going basis. Thus, it would be useful for the means for providing additional content to be easy for Web publishers to implement and maintain. It would be useful if such related content did not need to have information expressly entered for purposes of targeting it. It would be useful if the provision of such related content were not affected, at least directly, by interests in monetization. Finally, it would be useful if the source of the related content were a trusted and reliable entity, with the technical sophistication to provide useful, relevant (e.g., up-to-date), content.

§2. SUMMARY OF INVENTION

Embodiments consistent with the present invention provide content owners (e.g., Website publishers) with a simple mechanism to automatically summarize and display information (news, images, maps, etc.) related to inferred interests of a user or users visiting their Website. The targeting can driven by a variety of mechanisms including, for example, an automated contextual understanding of the content of the Web page, profile-based information derived from personal data supplied by, or inferred from actions by, the user visiting the Website, location-targeted information (e.g., inferred by the Website visitor's current geography), etc.

An embodiment consistent with the present invention (referred to as "Related Content Units") helps content owners to render useful, related, content by allowing for a variety of targeting methods to gather related pieces of Internet content and present them integrated into an HTML iFrame or a JavaScript/XML feed which can be easily integrated by the Website publisher onto the Web pages of their Website.

Additional targeting methods include Website publisher-supplied information identifying the contextual content they would like to produce. For example, a Website publisher could provide audience demographics to be used in determining the contents of a Related Content Unit.

§3. BRIEF DESCRIPTION OF THE DRAWINGS

FIGS. 5A-5F illustrate various formats for providing related searches, related news and related Web pages in a manner consistent with the present invention.

§4. DETAILED DESCRIPTION

Figure 1:
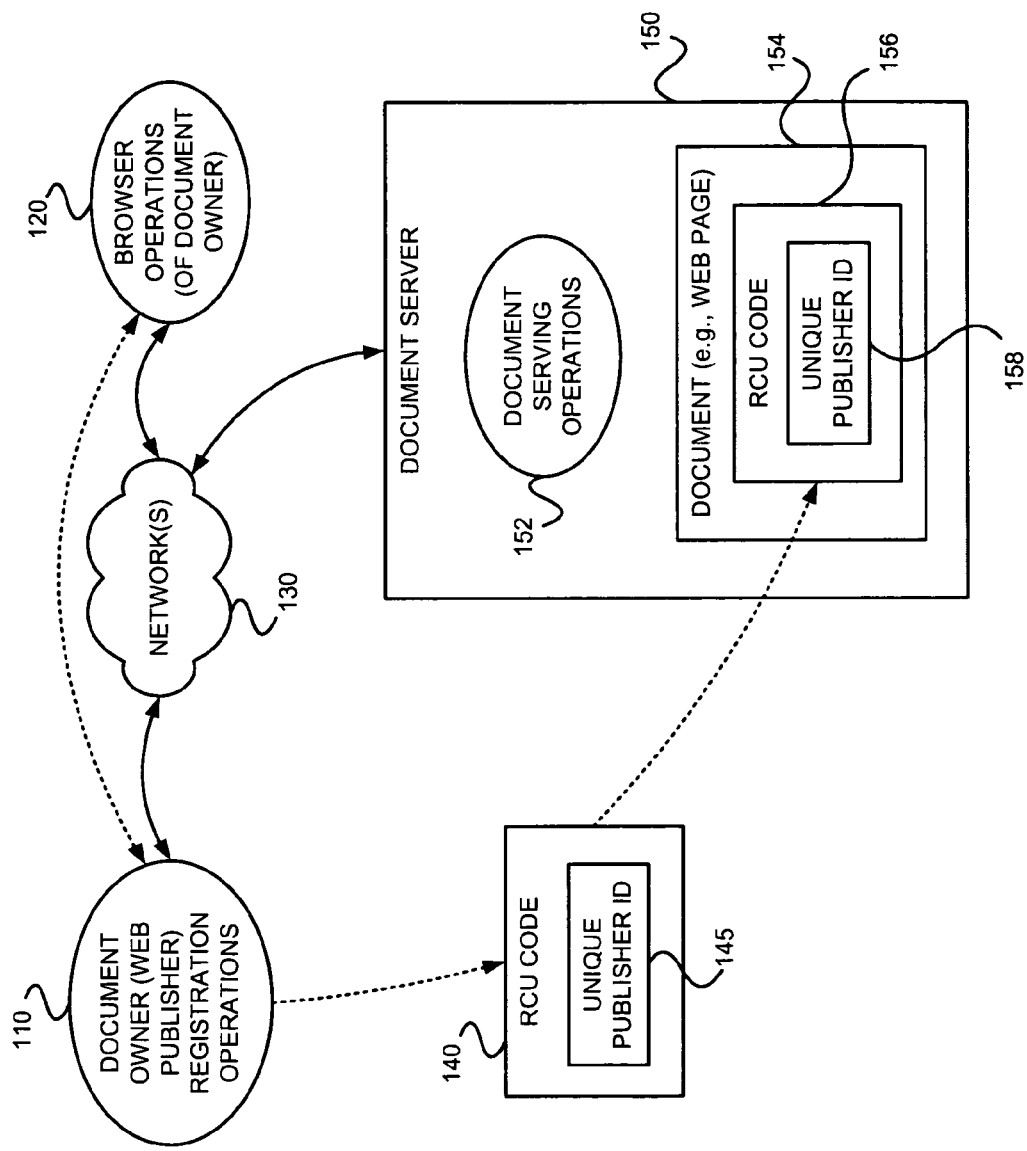
FIG. 1 is a bubble diagram illustrating operations that may be performed, and information that may be generated and/or used by such operations, in an exemplary embodiment consistent with the present invention.

The present invention may involve novel methods, apparatus, message formats, and/or data structures for determining and/or rendering content (or links to content) related to content or a Web page or some other document. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. In the following, "information" may refer to the actual information, or a pointer to, or a location of, such information. Thus, the present invention is not intended to be limited to the embodiments shown and the inventors regard their invention to include any patentable subject matter described.

§4.1 DEFINITIONS

A "property" is something on which related content can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available spots for related content (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Spots for related content in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page. A Website may include multiple Web pages.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

§4.2 Overview

Exemplary embodiments consistent with the present invention are described below. First, exemplary content owner registration methods, apparatus, and other means are described. Then, exemplary Related Content Unit serving and rendering methods, apparatus, and other means are described. The present invention is not limited to the exemplary embodiments described.

§4.3 Document Owner Registration

A Web publisher may visit a registration Website and receive code for getting related content (referred to as "Related Content Unit code" or "RCU code" below without loss of generality). Code may or may not require a registration process which inserts a unique ClientID (also referred to as "Publisher ID") into the code snippets (e.g., for purposes of tracking results). During this process, a Web publisher may select (or not) the categories of "related" information they wish to have returned to them, and may supply (or not) information relevant to the targeting of this related content (e.g., information about their Website). In at least some embodiments consistent with the present invention, the Website publisher can also specify the "look-and-feel" of the Related Content Unit to match or complement their Website's appearance.

Figure 2:
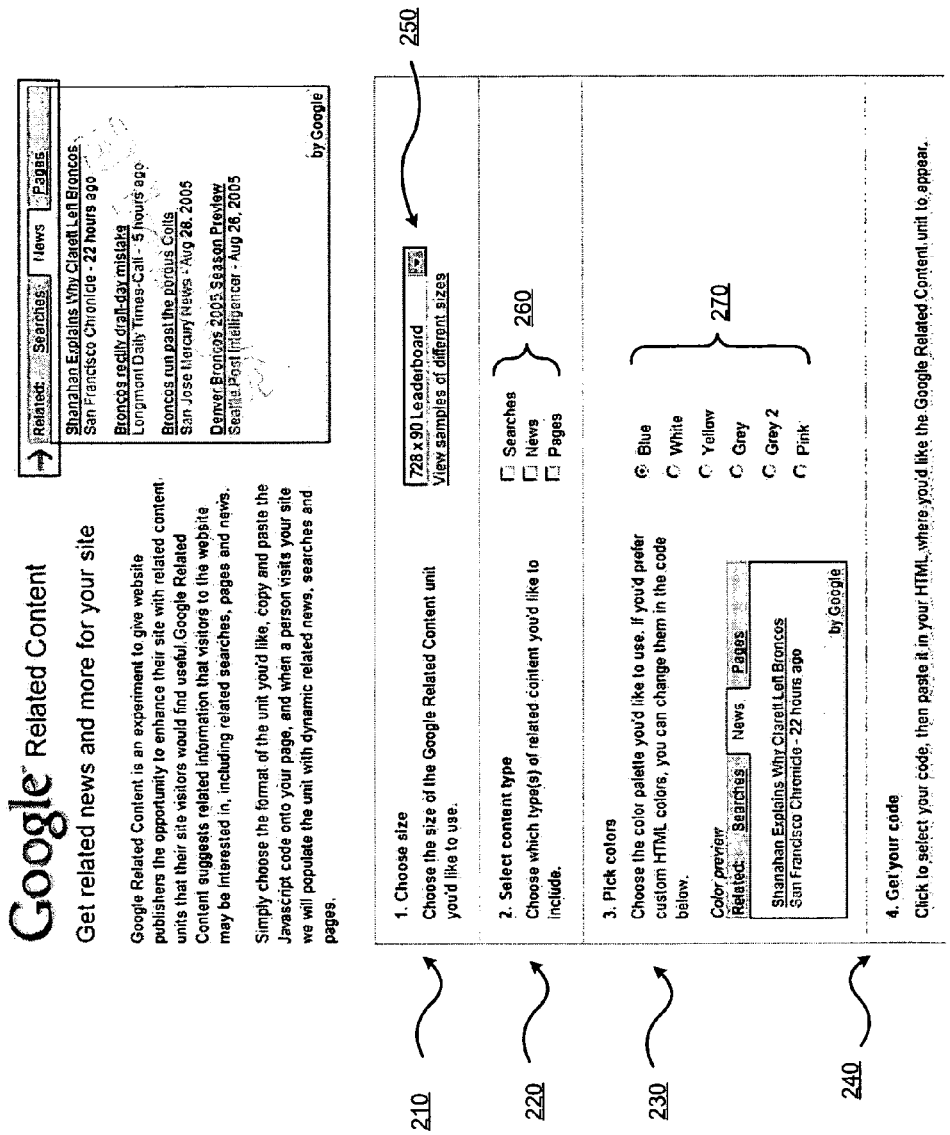
FIG. 2 illustrates an exemplary content owner interface screen for accepting content owner registration information in a manner consistent with the present invention.

For example, referring to FIGS. 1 and 2, document owner registration operations 110, browser operations 120 and document serving operations 152 of a document server 150 may communicate with one another via one or more networks 130, such as the Internet for example. Referring to FIG. 2, an exemplary content owner interface screen 200 may include a section 210 for choosing the size of the related content unit to be inserted into their document. This may include a drop-down menu 250 of various sizes that the content owner can select. The screen 200 may also include a section 220 for selecting a type of content to be included in the related content unit. In this example, the content owner can select one or more boxes 260 corresponding to one or more alternative content types, such as related searches, related news, related documents (e.g., Web pages, RSS feeds, images, audios, videos, etc.), etc. Although not shown, in at least some embodiments consistent with the present invention, if multiple types of related content types are selected, for presentation under different "tabs", the publisher may select the first tab (a default tab), thereby specifying which of the different types of related content is to be presented first to a user viewing Web pages of their Website. The screen 200 may further include a section 230 for picking customer colors for the related content unit to be rendered in their document. In this example, the content owner can select one from a plurality of color schemes 270. Finally, the screen 200 may include a section 240 for allowing the content owner to get RCU code and paste it at the location in their document where the content owner wants the related content unit to appear. Referring to FIG. 1, note that the RCU code 140/156 is included in the document (e.g., Web page) 154.

Still referring to FIG. 1, the RCU code 140 may be an iFrame unit or a configurable feed (XML or javascript). In the iFrame implementation, the publisher can "paste" the iFrame code into their Website template, or onto individual Web pages. When a Web page with the iFrame code is loaded into a browser for the first time, it alerts a related content server that the Web page (and/or other Web pages of the Website) needs to be visited (e.g., crawled) for related content targeting analysis. Notice that the RCU code 140 includes a unique identifier 145/158 for the content owner (e.g., Web publisher). However, unlike contextual advertising systems where advertising revenue is shared with content owners that show ads on their documents (e.g., Web pages), the RCU code need not (though it may) include a publisher identifier 145/158 since such information need not be known and tracked for purposes of revenue sharing.

An example of an RCU code as Javascript is:
<script type="text/javascript"><!--
google_rc_width=728;
google_rc_height=90;
google_rc_format="728x90_rc";
google_rc_modules=["news", "searches", "pages"]; /* First tab is the default. */ google_rc_color_line="cccccc";
google_rc_color_bg="ffffff";
google_rc_color_footer="ffffff";
google_rc_color_header="0000ee"; google_rc_color_text="000000"; google_rc_color_link="ff0000";
google_rc_color_source="6e6e6e"; //
google_rc_client="pub-xxxxxxxxxxxxxxx"; //
google_rc_cof="GALT:xxxxxxxxxxxxx"; //--></
script><script type="text/javascript"
src="http: // WWW.A.COM/rc/show_rc.js">
</script>

The line with the "google_rc_modules" includes modules corresponding to the types of related content (in this instances, news, searches, and pages) that the publisher selected during registration.

Figure 3:
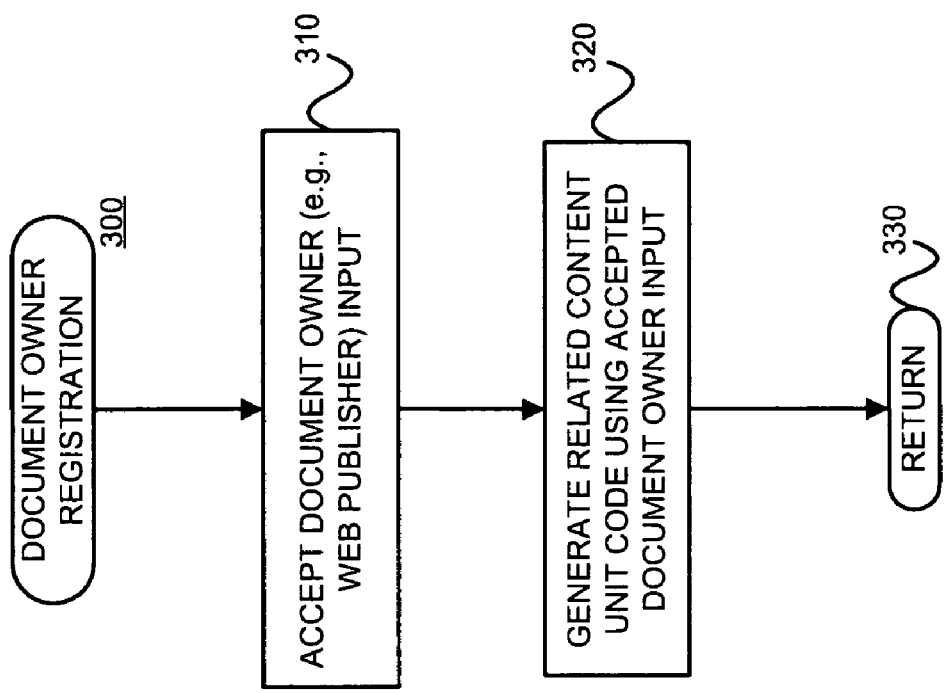
FIG. 3 is an exemplary method 300 for registering content owners in a manner consistent with the present invention.

FIG. 3 is an exemplary method 300 for registering content owners in a manner consistent with the present invention. Document owner input (Recall selections on screen 200 of FIG. 2.) is accepted. (Block 310) Then, RCU code is generated using the document owner input (Block 320), before the method 300 is left (Node 330). Although not shown, the document owner can then cut and paste, or copy and paste the RCU code into its document at the location where it wants the related content to be rendered.

§4.4 Serving and Rendering Related Content Units

Figure 4:
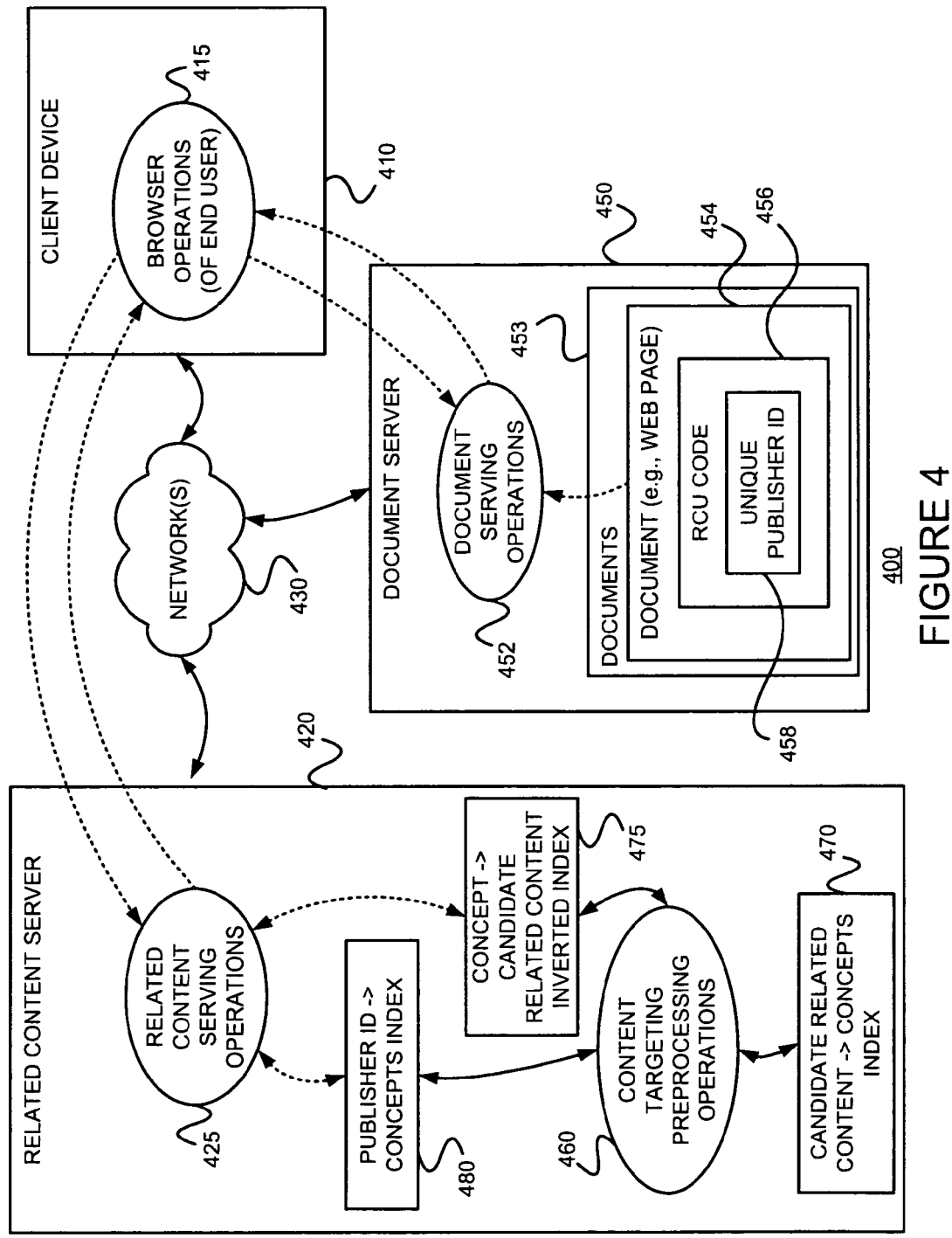
FIG. 4 illustrates an exemplary related content server, consistent with the present invention, in the context of an exemplary operating environment.

A related content server 420 may use techniques, such as those described in the '427 and '900 applications for example, to analyze content. FIG. 4 illustrates an exemplary related content server 420 in the context of an environment 400 including a client device 410 and a document server 450, all of which may communicate with one another via one or more networks 430, such as the Internet for example.

As stated above, the RCU code 456 may be an iFrame unit or a configurable feed (XML or javascript). In this example, the publisher has "pasted" the iFrame code 456 into their Website template. When the Web page 454 with the iFrame code 456 is loaded into a browser 415 for the first time, it alerts the related content server 420 that the Web page (and/or other Web pages of the Website) needs to be visited (e.g., crawled) for related content targeting analysis. For example, content targeting preprocessing operations 460 may analyze the Web page 454, perhaps in conjunction with other Web pages of the Web publisher's Website, to determine concepts. Techniques used to generate and/or identify such (e.g., weighted) concepts (referred to as probabilistic hierarchical inferential learner clusters or "PHIL clusters"), such as those described in U.S. Provisional Application Ser. No. 60/416, 144 (referred to as "the '144 provisional" and incorporated herein by reference), titled "Methods and Apparatus for Probabilistic Hierarchical Inferential Learner," filed on Oct. 3, 2002, and U.S. patent application Ser. No. 10/676,571 (referred to as "the '571 application" and incorporated herein by reference), titled "Methods and Apparatus for Characterizing Documents Based on Cluster Related Words," filed on Sep. 30, 2003 and listing Georges Harik and Noam Shazeer as inventors, may be used. The content targeting preprocessing operations 460 may generate an index 480 mapping publisher identifiers to one or more (e.g., weighted) PHIL clusters (or some other concepts).

The content targeting preprocessing operations 460 may similarly analyze other types of content (e.g., Web pages, news, searches, RSS feeds, audio content, video content, images, etc.) to determine an index of candidate related content 470 to (e.g., weighted) PHIL clusters (or some other concepts). The content may include a marker to identify its type (e.g., Web pages, news, searches, RSS fees, audio content, video content, images, etc.). Alternatively, different types of content may be stored in different indexes 470. An inverted index 475 mapping PHIL clusters (or some other concepts) to one or more pieces of candidate related content may be generated from the index 470.

As can be appreciated from the foregoing, in an offline or preprocessing stage, the content targeting preprocessing operations 460 may parse machine readable candidate content and generate lists of weighted "concepts" for each candidate content. For example, if the candidate content consists of a set of (e.g., all crawled) Web pages, then the content targeting preprocessing operations 460 might parse each Web page and create lists of weighted concepts for each Web page. For example an HTML Web page about sports cars might be represented by concepts such as "cars", "sports", "racing", "engines" etc, with each concept being assigned a weight that reflects how well it matches the Web page. Such weighted concepts may be PHIL clusters.

The various indexes 470, 475, 480 may be updated continuously, or upon the occurrence of various events (e.g., expiration of a time period).

Additional indexes (not shown) mapping locations to candidate related content, mapping user information to candidate related content, etc., may be determined and/or stored. Similarly, additional indexes (not shown) mapping publisher identifiers to various appropriate targeting information (e.g., one or more of a keyword(s), geography, or other sets of discrete Website and/or user information, etc.) may be determined and/or stored.

Having described various preprocessing that may occur, as well as various indexes that may be generated and/or stored, related content serving operations 425 are now described. Content targeting techniques, such as those described in the '427 and '900 applications for example, may be used to match request content with a set of candidate related content. The request content may include one or more of an email, a Web page, a Web page identifier, a publisher identifier, a document identifier, a query, an IP address (e.g., of a client device), a taxonomy category, and/or any form of machine understandable input. The candidate related content may be "related information" such as queries, Web pages, news, videos, audios, music, images, or any document. The related information selected may be then be rendered with (e.g., on) the Web page. Alternatively, or in addition, links to such related information may be rendered with the Web page.

For example, suppose that an exemplary related content serving operations 425 are to find Web pages related to an email message. If the email message concerns NASCAR racing, the email message would be the request content and (e.g., all analyzed) Web pages would be the candidate related content. Concepts (e.g., weighted PHIL clusters or PHIL clusters) of the request content could used to find Web pages with similar concepts (e.g., weighted PHIL clusters or PHIL clusters). Referring to FIG. 4, the concept to candidate content inverted index 475 may be used for this purpose.

Thus, when a request is made to the related content serving operations 425, if the request includes the publisher identifier (or Web page URL, or some other document identifier), and the index 480 includes concepts for that publisher (or Web page, or some other document), the (e.g., weighted) concepts can be obtained from the index 480. If, on the other hand, the request includes the content itself, the request content may be parsed and used to generate a list of weighted concepts. For example, if the request content is an email about a recent NASCAR event, then once the request has been parsed, a list of weighted concepts is generated for the email such as 'NASCAR', 'racing', 'cars', etc., each with a weight that describes the closeness of the match (similarity) between the concept and the concept(s) of the email.

Given lists of weighted concepts for request content and candidate related content, related content serving operations 425 try to match weighted request concepts against weighted candidate concepts (e.g., determine a degree of similarity) and select those candidates with the highest matching scores (e.g., the most similar). Continuing with the example of finding the best related Web pages to an email about NASCAR racing, the related content serving operations 425 could examine all Web pages that have concepts closely related to those in the email. In this instance, Web pages about 'cars' and 'racing' would match the email since the email and the Web pages contain common concepts.

Additional information in the request may also be used when determining related content. For example, a user's location may be inferred from an IP address of the client device 410. As another example, user information may be provided from the client device 410.

Single or multiple categories of related information (e.g., related news, related searches, related Web pages, related RSS feeds, related videos, related audios, etc.) may be integrated into the iFrame, permitting the user to select different tabbed (or other) displays of related content and browse through information related to the Web page, their geography or their broader interests. FIGS. 5A-5F illustrate various formats (300 by 250 pixels, 468 by 60 pixels, and 728 by 90 pixels) for providing related searches, related news and related Web pages. Naturally, other formats are possible.

§4.5 Apparatus

Figure 6:
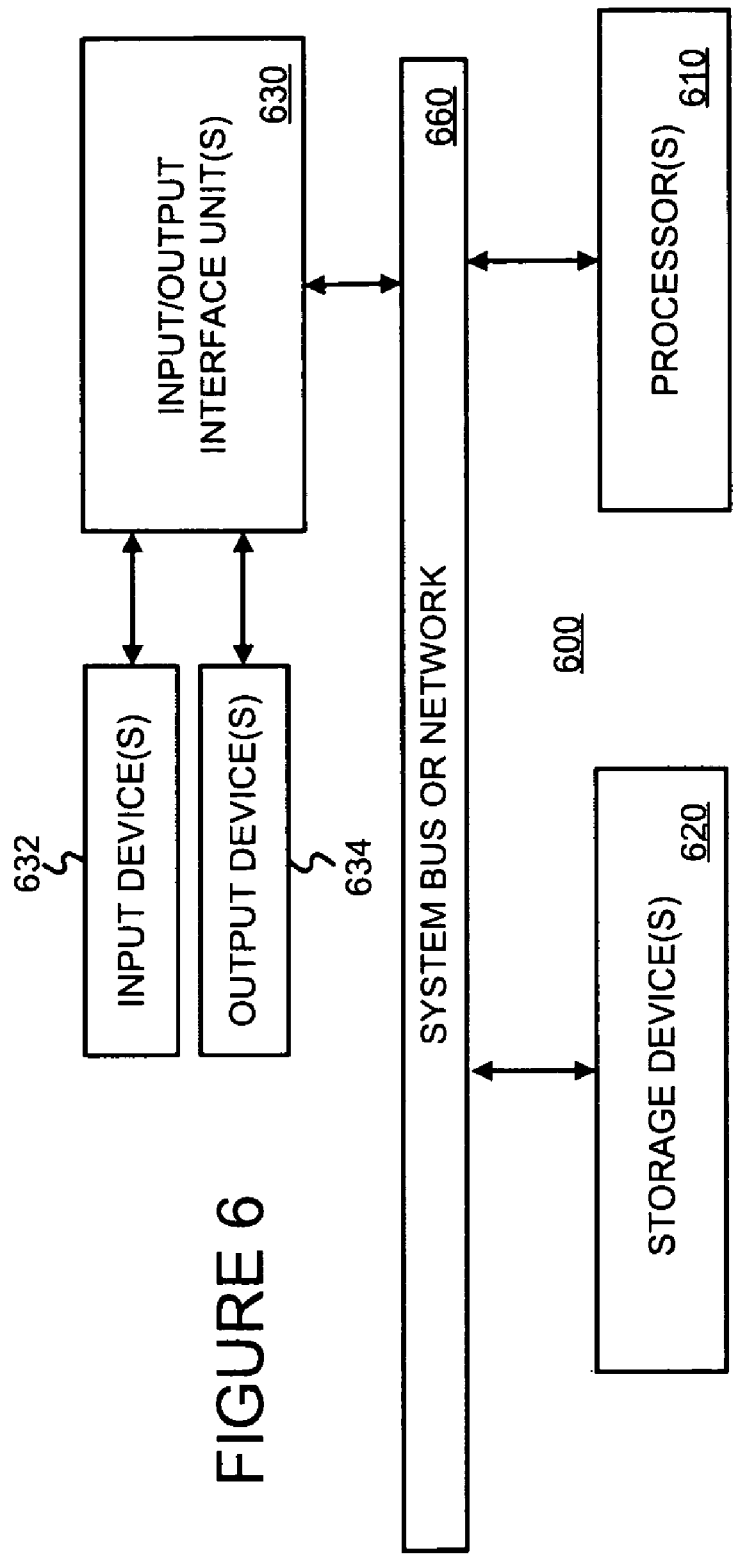
FIG. 6 is a block diagram of a machine 600 that may perform one or more of the operations discussed above, as well as store information used and/or generated by such operations.

FIG. 6 is a block diagram of a machine 600 that may perform one or more of the operations discussed above, as well as store information used and/or generated by such operations. The machine 600 includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C or C++ running on the Solaris operating system available from Sun Microsystems Inc. of Palo Alto, Calif., the Linux operating system widely available from a number of vendors such as Red Hat, Inc. of Durham, N.C., Java, assembly, Perl, etc.) to effect one or more aspects of the present invention. At least a portion of the machine executable instructions may be stored (temporarily or more permanently) on the one or more storage devices 620 and/or may be received from an external source via one or more input interface units 630.

In one embodiment, the machine 600 may be one or more conventional personal computers, mobile telephones, PDAs, etc. In the case of a conventional personal computer, the processing units 610 may be one or more microprocessors. The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media, etc.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

Naturally, many of the about described input and output means might not be necessary in the context of at least some aspects of embodiments consistent with the present invention.

The various operations described above may be performed by one or more machines 600, and the various information described above may be stored on one or more machines 600. Such machines 600 may be connected with one or more networks, such as the Internet for example.

§4.6 Alternatives and Refinements

Although the RCU has been described as including various (types of) documents, the RCU may include links to such documents instead, or in addition.

Although some of the embodiments described above used document content to determine related content, other document information may be used to determine related content.

In at least some embodiments consistent with the present invention, the related content unit may be extended to include the ability for a content owner (e.g., a Website publisher) to customize the content of the RCU by inserting other content feeds or swappable content units developed by the related content server (e.g., Google) or third parties. Thus, for example, the RCU may be extended to include one or more tabs to other information specified by the content owner. Such additional information may, but need not, be targeted by the related content server. Instead of targeting, the content owner may specify the information to be included in a tab or tabs. For example, a Website may define a tab in an RCU (to be provided on the Website) with a link or reference to an RSS feed specified by the Website publisher.

In at least some embodiments consistent with the present invention, the related content unit may be extended to include the ability for a partner to customize the look and feel of their RCU via support for custom cascading style sheet ("CSS"), or a color picker interface.

In at least some embodiments consistent with the present invention, the content owner (e.g., Web publisher) may be required to enter targeting keywords and then using these keywords to find "related content" (e.g., using just the presence of the provided keywords in the "candidate related content" as a proxy for relatedness).

In at least some implementations consistent with the present invention, a user interface to a general subject taxonomy is provided, thereby allowing the content owner (Web publisher) to navigate through the taxonomy to select one or more subjects. The selected subject(s) may then be used to select and/or narrow the related information to be displayed on their document.

Other information retrieval techniques may be used to select related content from candidate related content. For example, Page Rank may be used as a factor in selecting related content from candidate related content. Page Rank is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference).

Web publishers may be likely to deploy the related content unit in order to enhance the content of their Websites. Other parties could create "related content modules" for their content, which modules support integration into these the related content units. In this way, third parties with content can make that content available (e.g., in a predefined format specified by the related content server) to the related content server for analysis, and can create their own RCU tabs available for use by Websites. Such RCU tabs may be exposed to content owners as a selectable "content type" during registration. (Recall, e.g., options 260 of portion 220 of screen 200.) For example, a record label could create "related songs" related content module and make that content available for analysis by the related content server. The content owner can select "related songs" as a "content type" during registration. The related content server can analyze the related songs information provided by the record label. As another example, an online auction/marketplace Website such as Ebay for example, may place their product listings in a format/location which permits the related content server to analyze them. If a Website owner wants to show related content including related Ebay listings, they may select "Ebay listings" content type during registration. If the Website concerns guitar music, the related content server may find Ebay listings for used guitars, and provide such listings as related content linked from an RCU rendered on the Website.

§4.7 CONCLUSIONS

As can be appreciated from the foregoing, embodiments consistent with the present invention may provide an easy and effective means for content owners, such as Web publishers for example, to provide useful and relevant related content on their documents. The related content need not include information expressly entered for purposes of targeting. Monetization interests need not be considered in the selection or related content. Content owners can customize the presentation of the related content to complement the look-and-feel of their document, and can control what types of related content is provided. The use of a multi-tabbed iFrame permits a lot of useful information to be provided in a limited space, with various form factors.

What is claimed is:

1. A computer-implemented method comprising:
   a) accepting information for generating executable code responsive to at least one selection made by a publisher of a document that is obtainable from a document server, the executable code being adapted to facilitate obtaining unspecified content, selected from candidate content, determined by a related content server to relate to content of the document by matching one or more concepts identified from the document with one or more concepts associated with the candidate content;
   b) generating the executable code using the accepted information for requesting the unspecified content determined by the related content server to relate to the content of the document; and
   c) making the generated executable code available for retrieval and insertion into the document,
   wherein the unspecified content determined to relate to the content of the document by the related content server includes at least two different types of content selected from the candidate content.

2. The computer-implemented method of claim 1, wherein each of the at least two different types of content selected from the candidate content is presented in a separate tab of a multi-tabbed iFrame of the document.

3. The computer-implemented method of claim 1, wherein each of the at least two different types of content is selected from a respective group of the candidate content consisting of news, searches, Web pages, images, blogs, RSS feeds, audio files, videos files, and maps.

4. The computer-implemented method of claim 1, wherein the unspecified content determined to relate to the content of the document is determined independent of information expressly entered by an advertiser for purposes of targeting.

5. The computer-implemented method of claim 1, wherein the unspecified content determined to relate to the content of the document is determined without regard to advertising revenue.

6. The computer-implemented method of claim 1, wherein the at least two different types of content selected from the candidate content correspond to types of content selected by the publishers the document.

7. The computer-implemented method of claim 1, wherein the document is a Web page.

8. The computer-implemented method of claim 1, wherein the document is a Website.

9. A computer-implemented method comprising:
   a) obtaining, at a client device from a document server, a document having executable code that is adapted to facilitate obtaining unspecified content selected from candidate content, the unspecified content determined to relate to content of the document by a related content server, the executable code being inserted into the document after being generated using information for generating the executable code, the information being accepted responsive to at least one selection made by a publisher of the document;
   b) the client device issuing to the related content server a request for the unspecified content by executing the executable code; and
   c) the related content server identifying the unspecified content that is related to the content of the document by matching at least one concept obtained from the document with at least one concept associated with the candidate content,
   wherein the unspecified content determined to relate to the content of the document includes at least two different types of content that are specified by the at least one selection made by a publisher of the document.

10. The computer-implemented method of claim 9, wherein the at least one concept obtained from the document and the at least one concept associated with the candidate content are each weighted based on the content of the document.

11. The computer-implemented method of claim 9, wherein each of the at least one concept obtained from the document and wherein and the at least one concept associated with the candidate content is weighted using a probabilistic hierarchical inferential learner cluster based on the content of the document.

12. The computer-implemented method of claim 9, wherein each of the at least two different types of content is presented in response to the request from the client device in a separate tab of a multi-tabbed iFrame of the document.

13. The computer-implemented method of claim 9, wherein each of the at least two different types of content is selected from a group consisting of news, searches, Web pages, images, blogs, RSS feeds, audio files, videos files, and maps.

14. The computer-implemented method of claim 9, wherein the unspecified content determined to relate to the content of the document by the related content server is determined independent of information expressly entered by an advertiser for purposes of targeting.

15. The computer-implemented method of claim 9, wherein the unspecified content determined to relate to the content of document by the related content server is determined without regard to advertising revenue.

16. The computer-implemented method of claim 9, wherein the document is a Web page.

17. The computer-implemented method of claim 9, wherein the document is a Website.

18. The computer-implemented method of claim 9, wherein issuing the request to the related content server comprises issuing the request responsive to the client device loading the document for presentation.

19. An apparatus, comprising:
 a) processor means for accepting information for generating executable code responsive to at least one selection made by a publisher of a document that is obtainable from a document server, the executable code being adapted to facilitate obtaining unspecified content selected from candidate content, the unspecified content determined by a related content server to relate to content of the document by matching at least one concept identified from the document with one or more concepts associated with the candidate content;
 b) processor means for generating the executable code using the accepted information for requesting the unspecified content from the related content server; and
 c) processor means for making the generated executable code available for retrieval and insertion into the document,
 wherein the unspecified content determined to relate to the content of the document by the related content server includes at least two different types of content selected from the candidate content.

20. A client device, comprising:
 a) processor means for obtaining a document from a document server, the document having executable code that is adapted to facilitate obtaining unspecified content selected from candidate content, the unspecified content determined by a related content server to relate to content of the document, the executable code being inserted into the document after being generated using information for generating the executable code, this information being accepted responsive to at least one selection made by an owner of the document;
 b) processor means for issuing, to the related content server from the client device, a request for the unspecified content by executing the executable code; and
 c) processor means for determining, at the related content server using the candidate content, the unspecified content that relates to the content of the document by matching at least one concept obtained from the document with at least one concept associated with the candidate content,
 wherein the unspecified content determined to be related to the content of the document by the related content server includes at least two different types of content that are specified by the executable code.

21. The client device of claim 20, wherein the processor means for issuing the request to the related content server issues the request responsive to the client device loading the document for presentation.

22. A system for providing related content for a document, the system comprising:
 a document server for providing a document to one or more client devices over a network, the document including executable code generated for insertion into the document, the executable code being generated based upon input from a publisher of the document identifying one or more types of unspecified related content to be presented to a user of the document;
 a selected one of one or more client devices for requesting the document from the document server over the network, for executing the executable code contained in the document, and for creating a related content request for the unspecified related content based upon information specified in the executable code; and,
 a related content server for receiving the related content request for the unspecified related content from the selected client device over the network, for determining related content by matching at least one concept obtained from the document with at least one concept associated with candidate content, and for providing the matching related content selected from the candidate content to the client device over the network,
 wherein the related content server is configured to automatically select and update the candidate content for presentation to a user by periodically analyzing different types of content from one or more content servers without manual intervention.

23. A computer-implemented method comprising:
 receiving, at a related content server, a request for unspecified content related to content in a document from a selected one of one or more client devices,
 the request being generated by the selected client device based upon execution of executable code inserted into the document, the executable code being inserted into the document based upon information provided by a publisher of the document regarding the content of the document; and
 determining, at the related content server based upon the request for the unspecified content, related content related to the content of the document by matching at least one concept associated with the document with at least one concept associated with candidate content,
 wherein the candidate content is automatically selected and updated by the related content server for presentation to a user by periodically analyzing different types of content from one or more content servers without manual intervention.

24. A non-transitory computer-readable recording medium recorded with a computer program that, when executed by a processor, causes the processor to perform a method comprising:
 a) accepting information for generating executable code responsive to at least one selection made by a publisher of a document that is obtainable from a document server, the executable code being adapted to facilitate obtaining unspecified content, selected from candidate content, determined by a related content server to relate to content of the document by matching one or more concepts identified from the document with one or more concepts associated with the candidate content;
 b) generating the executable code using the accepted information for requesting the unspecified content determined by the related content server to relate to the content of the document; and
 c) making the generated executable code available for retrieval and insertion into the document, wherein the unspecified content determined to relate to the content of the document by the related content server includes at least two different types of content selected from the candidate content.

25. A non-transitory computer-readable recording medium recorded with a computer program that, when executed by a processor, causes the processor to perform a method comprising:

a) obtaining, at a client device from a document server, a document having executable code that is adapted to facilitate obtaining unspecified content selected from candidate content, the unspecified content determined to relate to content of the document by a related content server, the executable code being inserted into the document after being generated using information for generating the executable code, the information being accepted responsive to at least one selection made by a publisher of the document;

b) the client device issuing to the related content server a request for the unspecified content by executing the executable code; and c) the related content server identifying the unspecified content that is related to the content of the document by matching at least one concept obtained from the document with at least one concept associated with the candidate content, wherein the unspecified content determined to relate to the content of the document includes at least two different types of content that are specified by the at least one selection made by a publisher of the document.

26. A non-transitory computer-readable recording medium recorded with a computer program that, when executed by a processor, causes the processor to perform a method comprising:

receiving, at a related content server, a request for unspecified content related to content in a document from a selected one of one or more client devices, the request being generated by the selected client device based upon execution of executable code inserted into the document, the executable code being inserted into the document based upon information provided by a publisher of the document regarding the content of the document; and determining, at the related content server based upon the request for the unspecified content, related content related to the content of the document by matching at least one concept associated with the document with at least one concept associated with candidate content, wherein the candidate content is automatically selected and updated by the related content server for presentation to a user by periodically analyzing different types of content from one or more content servers without manual intervention.

27. An apparatus, comprising:
one or more processors configured to:
accept information for generating executable code responsive to at least one selection made by a publisher of a document that is obtainable from a document server, the executable code being adapted to facilitate obtaining unspecified content selected from candidate content, the unspecified content determined by a related content server to relate to content of the document by matching at least one concept identified from the document with one or more concepts associated with the candidate content;

generate the executable code using the accepted information for requesting the unspecified content from the related content server; and make the generated executable code available for retrieval and insertion into the document, wherein the unspecified content determined to relate to the content of the document by the related content server includes at least two different types of content selected from the candidate content.

28. A client device, comprising:
one or more processors configured to:
obtain a document from a document server, the document having executable code that is adapted to facilitate obtaining unspecified content selected from candidate content, the unspecified content determined by a related content server to relate to content of the document, the executable code being inserted into the document after being generated using information for generating the executable code, this information being accepted responsive to at least one selection made by an owner of the document;

issue, to the related content server from the client device, a request for the unspecified content by executing the executable code; and determine, at the related content server using the candidate content, the unspecified content that relates to the content of the document by matching at least one concept obtained from the document with at least one concept associated with the candidate content, wherein the unspecified content determined to be related to the content of the document by the related content server includes at least two different types of content that are specified by the executable code.

* * * * *